Patented Oct. 1, 1935

2,015,706

UNITED STATES PATENT OFFICE 2,015,706

PROCESS FOR MAKING ALKYL HALIDES

Benjamin T. Brooks, Greenwich, Conn., assignor, by mesne assignments, to Standard Alcohol Company, Wilmington, Del., a corporation of Delaware No Drawing. Application October 1, 1931, Serial No. 566,321

17 Claims. (Cl. 260—162)

My present invention relates to the preparation of alkyl halides and more particularly to the preparation of alkyl halides from ethers.

Heretofore, it has been proposed to prepare alkyl halides from the corresponding alcohols and usually by the treatment of the alcohol with phosphorus halides such as phosphorus trichloride, phosphorus penta-chloride or phosphorus tri-bromide or by the distillation of an alcohol with a concentrated halogen acid usually in the presence of sulphuric acid, or other catalyst. It has also been proposed to treat paraffin hydrocarbons with chlorine for the preparation of the corresponding halides. In the use of such methods, it is generally necessary to use a substantial amount of heat and complicated and expensive apparatus which make the process and the product objectionably expensive.

The principal object of my invention is to provide an improved method for preparing alkyl halides from aliphatic ethers, which I have found to be readily reacted upon by halogen acids in the presence of certain metal halides to give nearly quantitative yields of the corresponding halides, when the procedure defined herein is followed.

The metal halides which are found to be particularly useful for this purpose are the anhydrous halogen salts of zinc, ferric iron, aluminum, and the like. The particular halogen salt used depends upon the particular halogen acid used in the process; for example, when I use hydrogen chloride for making an alkyl chloride, a metal chloride such as zinc chloride, ferric chloride, aluminum chloride and the like is used.

While ethers from any suitable source may be used, I particularly contemplate the use of ethers formed incidentally in the syntheses of alcohols from the corresponding olefines. In such syntheses, olefines, such as ethylene, are absorbed in sulphuric acid which is then diluted and the alkyl hydrogen sulphates, such as ethyl hydrogen sulphate, formed are distilled off. In such a process, large proportions of impure alkyl ethers are produced unless the alkyl hydrogen sulphate is exceedingly highly diluted. My process is particularly adapted to be used in conjunction with such a process which produces impure ether as a by-product, the ether thus being saved and treated to form derivatives of the alcohol formed in the main process.

Referring more particularly to my preferred method of carrying out the present invention when treating ethyl ether, dry hydrogen chloride gas is passed into a cool mixture of ethyl ether and anhydrous zinc chloride, until substantially two molecular proportions of hydrogen chloride have been added. When the reaction is complete, the mixture is gently warmed and the ethyl chloride distilled off. The ethyl chloride produced is washed with water to remove hydrogen chloride and traces of ethyl alcohol. Due to its low boiling point, the ethyl chloride may be washed while in the gaseous state. The washed ethyl chloride is finally subjected to a fractional distillation to remove small proportions of unchanged ethyl ether.

In using the process as above described it is generally necessary to maintain the temperature of the mixture below the boiling point of the ether which is being converted and preferably below the boiling point of the alkyl halides being formed. It is desirable to maintain the temperature below the boiling point of the ether so as to obtain the most efficient conversion thereof as, during the reaction, the ether should be admixed with and brought into intimate contact with the metal halides. The metal halides used appear to act as catalytic agents. It is generally advantageous to maintain the temperature of the mixture below the boiling point of the halide formed as this permits more ready handling of the mixture and the use of less expensive and complicated apparatus and causes the ether to be more completely converted. While ethers are well known for their chemical stability, I have found that the reaction in my process proceeds rapidly and smoothly at the low temperatures specified.

Water is formed during the reaction and is absorbed by the metal salt, eventually rendering the salt inactive. The salt must then be dehydrated before it can be used to treat a new batch of material.

In practicing my invention I may employ a batch process using a closed vessel properly refrigerated and provided with stirrers for stirring the mixture during the reaction. The invention is also adapted for operation as a continuous process such as by passing halogen acid gas through a stream of the ether carrying the metal halide in suspension or by spraying the ether and metal halide into a stream of the halogen acid gas or by other similar processes.

A still further method of carrying my invention into effect and one which has been very satisfactory in practice comprises passing a mixture of the ether vapor and the halogen acid gas through a tower loosely packed with lumps of the metal halide. The lumps of the salt present large contact surfaces and all portions of the mixed gases are brought into contact with them. In using this process, it is not necessary to take any special precautions to cool the tower or the contents thereof as the ether is in vapor form and readily contacts with the salts in the tower as it passes therethrough. This method is particularly adapted for continuous operation as, when the metal salt has absorbed sufficient moisture to cause it to become inactive, it is merely necessary to pass the gases to another tower containing fresh salt. The salt in the tower which has become inactive may then be dehydrated. The tower containing the dehydrated salt may then be used to replace the second tower when the salt in it has become rendered inactive by the absorption of moisture.

While I have described specific methods of carrying out my process using hydrogen chloride and zinc chloride in the treatment of ethyl ether, it is to be understood that such description is merely by way of illustration and my invention relates generally to the preparation of alkyl halides and may be used in treating other ethers and substituting other halogen acids and other halogen metal salts than those particularly set out in the example given.

It will be readily apparent to those skilled in the art that many changes and modifications may be made in my invention and the methods herein described for carrying the same into effect without, however, departing from the spirit thereof or the scope of the following claims. Accordingly, my invention as set out in the claims is to be interpreted in the broadest sense permissible in view of the prior art.

I claim:

1. Method of preparing an alkyl halide comprising reacting an aliphatic ether with a halogen acid in the presence of a metal halide at a temperature below the boiling point of the alkyl halide and at the close of the reaction separating the alkyl halide.

2. The method of preparing an alkyl halide which comprises reacting an aliphatic ether with an anhydrous halogen acid and an anhydrous metal halide at a temperature below the boiling point of the resulting alkyl halide.

3. The method of preparing an alkyl halide which comprises passing halogen-acid-gas through a mixture of liquid ethyl ether and a metal halide.

4. The method of preparing an alkyl halide which comprises passing halogen-acid-gas through a mixture of ethyl ether and a metal halide and maintaining the mixture during the reaction at a temperature below that which is sufficient to drive off water of reaction from the metal halide.

5. The method of preparing an alkyl halide which comprises passing halogen-acid-gas through a mixture of ethyl ether and a metal halide and maintaining the mixture at a temperature below the boiling point of the ether during the reaction.

6. The method of preparing an alkyl halide which comprises passing halogen-acid-gas through a mixture of ethyl ether and a metal halide and maintaining the mixture at temperatures below the boiling point of the resulting alkyl halide during the reaction.

7. The method of preparing an alkyl halide which comprises passing halogen-acid-gas through a mixture of ethyl ether and a metal halide maintaining the mixture at temperatures below the boiling point of the resulting alkyl halide during the reaction, and separating alkyl halide from the resulting mixture.

8. The method of preparing an alkyl halide which comprises passing halogen-acid-gas through a mixture of ethyl ether and a metal halide, maintaining the mixture at temperatures below the boiling point of the resulting alkyl halide, separating alkyl halide from the resulting mixture, and washing said alkyl halide with water.

9. The method of preparing an alkyl halide which comprises passing halogen-acid-gas through a mixture of ethyl ether and a metal halide, maintaining the mixture at temperatures below the boiling point of the resulting alkyl halide during the reaction, separating impure alkyl halide from the resulting mixture, and washing the separated alkyl halide in the gaseous state with water.

10. The method of preparing an alkyl halide which comprises passing halogen-acid-gas through a mixture of ethyl ether and a metal halide, maintaining the mixture at temperatures below the boiling point of the resulting alkyl halide during the reaction, separating impure alkyl halide from the resulting mixture, and washing said alkyl halide with water at room temperatures.

11. The method of preparing an alkyl halide which comprises passing a mixture of ether and halogen acid into contact with an anhydrous metal halide at a temperature below that which is sufficient to drive off water of reaction from the metal halide.

12. The method of preparing an alkyl halide which comprises reacting an aliphatic ether with a halogen acid and an anhydrous metal halide at a temperature below that which is sufficient to drive off water of reaction from the metal halide.

13. The method of preparing an alkyl halide which comprises reacting an aliphatic ether with an anhydrous halogen acid and a metal halide at a temperature below that which is sufficient to drive off water of reaction from the metal halide.

14. Method of making an alkyl halide, comprising continuously passing a mixture of the vapor of an aliphatic ether and a halogen acid gas through a contact zone containing a metal halide presenting an extended surface, at a temperature below that which is sufficient to drive off water of reaction from the metal halide, and recovering the alkyl halide.

15. Method of making ethyl chloride, comprising passing hydrogen chloride gas into a mixture of ethyl ether and an anhydrous metal halide, maintaining the temperature of the mixture below the boiling point of ethyl ether, at the close of the reaction distilling off the ethyl chloride, and collecting the same.

16. Method of making ethyl chloride, comprising passing dry hydrogen chloride gas into a mixture of ethyl ether and an anhydrous metal halide, until substantially two molecular proportions of hydrogen chloride with respect to the ether have been added, maintaining the temperature of the mixture below the boiling point of ethyl chloride, thereafter warming the mixture to distill the ethyl chloride, washing the ethyl chloride in the gaseous state, and purifying the same by fractional distillation.

17. Method of preparing an alkyl halide which comprises reacting an aliphatic ether with a halogen acid in the presence of a dehydrating metal halide at a temperature below that which is sufficient to drive off water of reaction from the metal halide.

BENJAMIN T. BROOKS.